(12) United States Patent
Forehand

(10) Patent No.: US 9,201,630 B2
(45) Date of Patent: Dec. 1, 2015

(54) RANDOM NUMBER GENERATION USING STARTUP VARIANCES

(75) Inventor: Monty Aaron Forehand, Loveland, CO (US)

(73) Assignee: Seagate Technology LLC, Cupertino, CA (US)

( * ) Notice: Subject to any disclaimer, the term of this patent is extended or adjusted under 35 U.S.C. 154(b) by 852 days.

(21) Appl. No.: 13/371,251

(22) Filed: Feb. 10, 2012

(65) Prior Publication Data

US 2013/0212140 A1  Aug. 15, 2013

(51) Int. Cl.
G06F 7/58 (2006.01)

(52) U.S. Cl.
CPC ...................................... *G06F 7/588* (2013.01)

(58) Field of Classification Search
None
See application file for complete search history.

(56) References Cited

U.S. PATENT DOCUMENTS

| | | | |
|---|---|---|---|
| 5,510,698 | A | 4/1996 | Stankovic et al. |
| 5,961,577 | A | 10/1999 | Soenen et al. |
| 5,963,104 | A | 10/1999 | Buer |
| 6,061,702 | A | 5/2000 | Hoffman |
| 6,065,029 | A | 5/2000 | Weiss |
| 6,324,558 | B1 | 11/2001 | Wilber |
| 6,369,727 | B1 | 4/2002 | Vincze |
| 6,643,374 | B1 | 11/2003 | Wells et al. |
| 6,831,910 | B1 | 12/2004 | Moon et al. |
| 6,831,980 | B1 | 12/2004 | Borza et al. |
| 7,752,247 | B2 | 7/2010 | Wilber |
| 7,962,539 | B2 | 6/2011 | Barak et al. |
| 2003/0037079 | A1 | 2/2003 | Wilber |
| 2004/0017235 | A1 | 1/2004 | Hars |
| 2005/0004959 | A1 | 1/2005 | Hars |
| 2005/0004960 | A1 | 1/2005 | Hars |
| 2006/0294312 | A1 | 12/2006 | Walmsley |
| 2007/0100921 | A1 | 5/2007 | Barnett et al. |
| 2008/0136395 | A1 | 6/2008 | Bennett |
| 2008/0313249 | A1 * | 12/2008 | Fukushima et al. .......... 708/251 |
| 2009/0077147 | A1 | 3/2009 | Hars |
| 2009/0106339 | A1 | 4/2009 | Vasyltsov et al. |
| 2010/0106757 | A1 | 4/2010 | Matthews, Jr. et al. |

(Continued)

FOREIGN PATENT DOCUMENTS

| | | |
|---|---|---|
| EP | 0 365 930 | 5/1990 |
| EP | 1 361 507 | 11/2003 |

(Continued)

OTHER PUBLICATIONS

M. Dichtl et al. "High Speed True Random Number Generation with Logic Gates Only." Cryptographic Hardware and Embedded Systems—CHES 2007, vol. 4727, p. 45-62 (2007).

(Continued)

*Primary Examiner* — Michael D Yaary
(74) *Attorney, Agent, or Firm* — Crawford Maunu PLLC

(57) ABSTRACT

Random numbers are generated according to a variety of solutions. A particular solution relates to a method for generating the random number. A common start signal is provided to each of a plurality of inverter components of a ring oscillator circuit. This causes the ring oscillator circuit to enter a metastable mode. At least a first bit and a second bit of a random number are both generated in parallel. The parallel generation of the bits involves the generation of the first bit from entropic properties of a signal of a first one of the plurality of inverter components and the generation of the second bit from entropic properties of a signal of a second one inverter components.

16 Claims, 5 Drawing Sheets

(56) References Cited

U.S. PATENT DOCUMENTS

| | | |
|---|---|---|
| 2011/0096930 A1 | 4/2011 | Walmsley |
| 2011/0123022 A1 | 5/2011 | Oishi et al. |
| 2011/0128081 A1 | 6/2011 | Hars |
| 2011/0131263 A1 | 6/2011 | Vasyltsov et al. |
| 2011/0131264 A1 | 6/2011 | Hars |
| 2012/0233232 A1* | 9/2012 | Vergnes et al. ............... 708/251 |

FOREIGN PATENT DOCUMENTS

| | | |
|---|---|---|
| WO | WO 00/59513 | 10/2000 |
| WO | WO 01/79989 | 10/2001 |
| WO | WO 2004/012334 | 2/2004 |

OTHER PUBLICATIONS

I. Vasyltsov et al. "Fast Digital TRNG Based on Metastable Ring Oscillator." CHES 2008, 10$^{th}$ Int'l Workshop, p. 164-180 (Aug. 2008).

M. Epstein et al. "Design and Implementation of a True Random Number Generator Based on Digital Circuit Artifacts." CHES 2003, vol. 2779, 14 pgs (Sep. 2003).

V. Fischer et al. "Simple PLL-Based True Random Number Generator for Embedded Digital Systems." DDECS 7$^{th}$ IEEE Workshop, pp. 129-136 (Apr. 2004).

V. Fischer et al. "True Random Number Generators in Configurable Logic Devices." Project ANR—ICTeR, Vers. 1.02, pp. 1-58 (Feb. 2009).

L. Hars. "Random Number Generation Based on Oscillatory Metastability in Ring Circuits." Cryptology ePrint Archive: Report 2011/637, pp. 1-15 (2011).

L. Hars. "Random Topics (selling sand in the desert)." Summercon 2004—PowerPoint, www.hars.us/papers/random topics-summercon.ppt. 65 pgs.

S. Callegari. "Embeddable ADC-Based True Random Number Generator for Cryptographic Applications Exploiting Nonlinear Signal Processing and Chaos." IEEE Transact. On Signal Processing, vol. 53, No. 2, pp. 793-805 (Feb. 2005).

W. Che et al. "Scheme of Truly Random Number Generator Application in RFID Tag." Auto-ID Labs White Paper, Fudan WP-Hardware-023, p. 1-11 (2006).

S. Kim et al. "Combined Dithered Sigma-Delta Modulation based Random PWM Switching Scheme." Journal of Power Electronics (JPE), vol. 5, No. 9, pp. 667-679 (Sep. 2009).

Wayne R. Coppock and Colin R. Philbrook. "A Mathematical and Physical Analysis of Circuit Jitter with Application to Cryptographic Random Bit Generation." Worcester Polytechnic Institute. B.S. Degree Project Report, pp. 1-36 (submitted Apr. 28, 2005).

Markus Rohe. "RANDy—A True-Random Generator Based on Radioactive Decay." Saarland University, pp. 1-36 (2003).

G. Zhang et al. "Zigguarat-based Hardware Gaussian Random Number Generation." Field Programmable Logic and Applications, 2005. International Conference, 6 pgs (2005).

J. Holleman et al "A 3μW CMOS True Random Number Generator With Adaptive Floating-Gate Offset Cancellation." IEEE Journal of Solid State Circuits, vol. 43, No. 5, pp. 1324-1336 (May 2008).

C. Petrie et al. "Modeling and simulation of oscillator-based random number generators." Circuit and Systems, 1996 IEEE International Symposium, vol. 4, pp. 324-327 (May 1996). Abstract Only.

* cited by examiner

RANDOM NUMBER GENERATION USING STARTUP VARIANCES

FIELD OF THE INVENTION

Aspects of the present disclosure relate to generating random numbers from entropic properties of ring oscillator circuits during oscillation startup.

BACKGROUND

Computer systems generally contain some type of mass-storage memory that is able to retain data when the computer system is powered down. This type of memory is referred to as nonvolatile memory because it is able to maintain data integrity when the computer system is not powered. A common type of nonvolatile mass-storage memory is a hard disc drive (HDD) that uses a rotating magnetic media. HDDs are used for home-computers, servers, and various other devices. HDDs with rotating magnetic media have been in use for many years and have undergone various improvements, including efficiency, reliability and memory capacity. Various applications, however, are beginning to use other types of nonvolatile memory with more frequency. Solid State Devices/Drives (SSDs) are one such alternative nonvolatile memory. SSDs are attractive for many applications because, unlike HDDs, they have no need for moving parts. Thus, they do not have the mechanical aspects inherent in HDDs.

Nonvolatile mass-storage memory drives present a variety of security problems when used to store sensitive data. To combat these security problems, some drives automatically encrypt data as it is stored. Seagate Secure™ Self-Encrypting Drives provide an example of such drives. Moving from HDDs to SSDs, however, raises a number of issues.

SUMMARY

The present disclosure is directed to systems and methods for use with the generation of random numbers using metastable properties of ring oscillators as a source of randomness. These and other aspects of the present disclosure are exemplified in a number of illustrated implementations and applications, some of which are shown in the figures and characterized in the claims section that follows.

Embodiments of the present disclosure are directed toward a method for generating a random number. A common start signal is provided to each of a plurality of inverter components of a ring oscillator circuit. This causes the ring oscillator circuit to enter a metastable mode. At least a first bit and a second bit of a random number are both generated in parallel. The parallel generation of the bits involves the generation of the first bit from entropic properties of a signal of a first one of the plurality of inverter components and the generation of the second bit from entropic properties of a signal of a second one inverter components.

Various other embodiments of the present disclosure are directed toward a random number generating circuit. The random number generating circuit includes at least three NAND gates connected in series to form a ring oscillator circuit. A common startup signal line is connected to an input of each of the least three NAND gates. There are at least three entropic capture circuits and each entropic capture circuit is configured and arranged to quantify, in parallel with the other entropic capture circuits, entropic properties of an output signal from a corresponding NAND gate. A memory storage circuit concatenates and stores each of the quantified entropic properties as a respective bit of a random number.

The above summary is not intended to describe each illustrated embodiment or every implementation of the present disclosure. The figures and detailed description that follow, including that described in the appended claims, more particularly exemplify these embodiments.

BRIEF DESCRIPTION OF THE DRAWINGS

The disclosure may be more completely understood in consideration of the detailed description of various embodiments and in connection with the accompanying drawings as follows.

Figure 1:
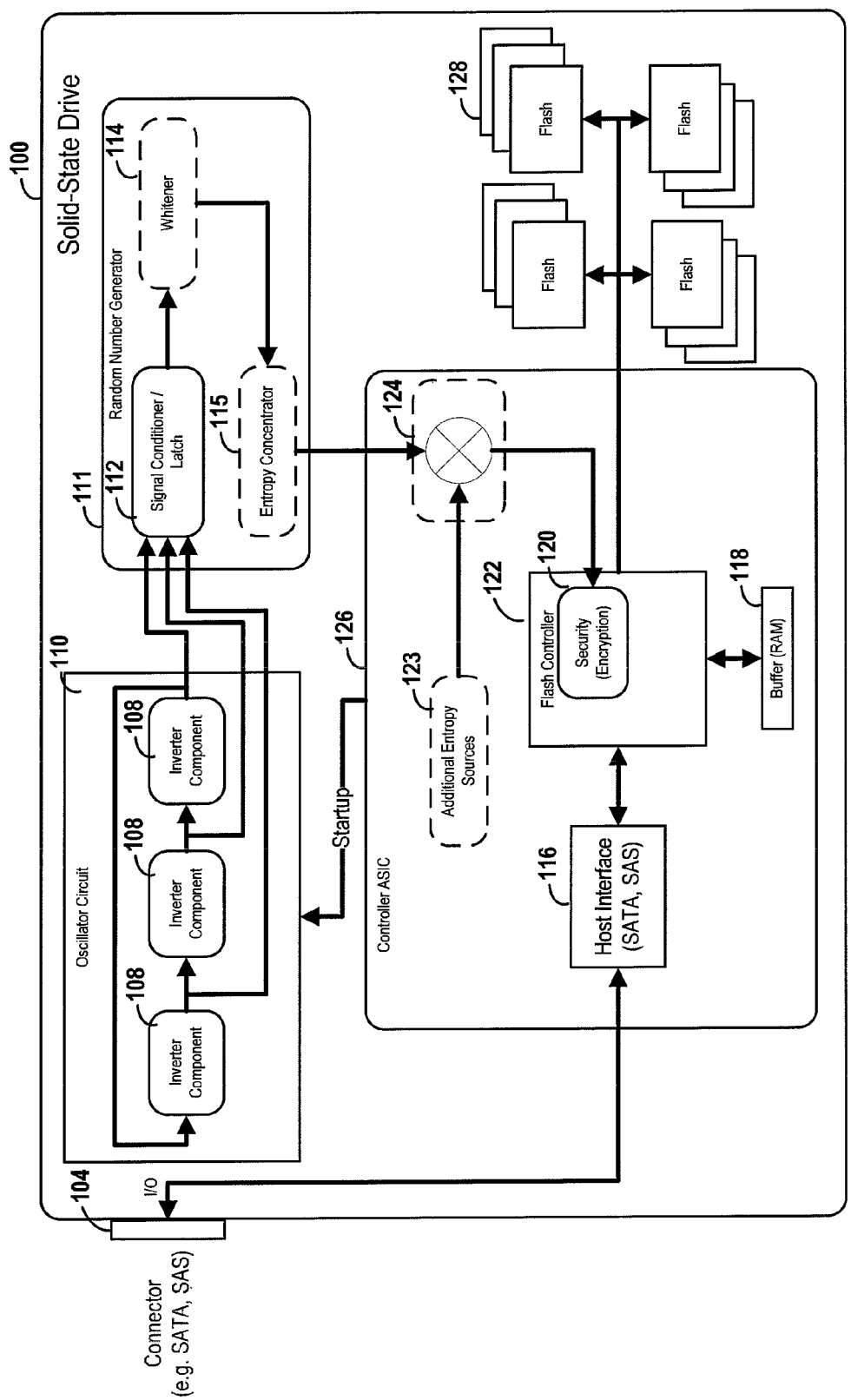
FIG. 1 depicts a solid-state drive (SSD) with a random number generation circuit, consistent with embodiments of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure are believed to be useful for generating random numbers. A particular application of the present disclosure relates to random number generation using entropic properties of ring oscillator circuits during oscillation startup as a source of randomness, which can be particularly useful in solid state devices (SSDs) that provide nonvolatile memory storage alternatives to traditional rotating magnetic media. While the present disclosure is not necessarily limited to such applications, various aspects of the invention may be appreciated through a discussion of various examples using this context.

An embodiment of the present disclosure relates to methods and circuits that generate random numbers, which can be used as part of the cryptographic algorithms. For instance, some cryptographic algorithms rely upon data being unpredictable. To achieve this unpredictability, some cryptographic algorithms may require a steady supply of random numbers. The strength of such cryptographic algorithms is often only as good as the random number generation process. A poor random number generation process can result in an attacker being able to defeat the cryptographic algorithms.

The generation of high-entropy random numbers is useful for a variety of applications. One such application relates to security devices that encrypt and decrypt information. For instance, the United States government's Cryptography Module Validation Program validates cryptographic modules against the Federal Information Processing Standards Publication (FIPS PUB) 140-2, which is fully incorporated herein by reference. As part of this validation, portions of random number generators are assessed for their entropy and resistance to hacking. Accordingly, embodiments of the present disclosure relate to providing entropy sufficient to meet this and other standards. Moreover, aspects of the present disclosure recognize that cost savings can be significant when using entropic properties of ring oscillator circuits, e.g., because the ring oscillator circuits are relatively simple, small and low cost in terms of circuit design constraints.

Random number generators can be used in many different applications including, but not limited to, self-encrypting disc drives, such as the Seagate Secure™ Self-Encrypting Drives. Random numbers can be used to generate encryption keys that are then used to provide encrypted secure communication. Many cryptographic algorithms use nonces (numbers only used once). Hard disc drives have a number of physical entropy sources that can be used to initialize or seed cryptographic random number generators. Many of these physical entropy sources are derived from the mechanical movement of the disk drive components. The entropy of such physical sources provides a level of confidence that the generated random numbers are truly random.

Solid state drives (SSDs) do not include many of the physical sources of entropy because they have little or no moving parts. Accordingly, aspects of the present disclosure are directed toward random number generation using entropy from ring oscillator circuits, whether in an SSD or otherwise.

Particular embodiments of the present disclosure are directed toward a ring oscillator circuit that is configured to respond to a startup signal by entering a metastable oscillation mode. Before the startup signal is activated, the ring oscillator circuit is in a stable condition. Once the startup signal is activated, the inverting components of the ring oscillator circuit each enter a metastable condition in which they alternate values in random manner. An entropy capture circuit captures data bits for multiple stages of the ring oscillator circuit in parallel, thereby generating a random number with multiple bits. Surprisingly, the ring oscillator circuit can be configured such that the metastable oscillation allows for such parallel capture of bits for random number generation.

The sources of the entropic properties can be many including, but are not necessarily limited to, variations in component (gate) delays, electrical noise (internal or external), variations in temperature, component tolerances and signal delay due to routing. These and other factors create both small signal variations, such as jitter, and larger signal variations in the metastable oscillation. Surprisingly, each of the inverting components (gates) of the ring oscillator switch oscillates in a random fashion during a time period that varies for each start up. Once the varying time period is over, the ring oscillator switch enters a stable oscillation period. Small differences in the properties (delay, impedance, drive strength, etc.) of the inverting components, noise and other variables result in the individual inverting components switching at slightly different times. Phase differences between the inverting components accumulate and provide timing separation between the switching of the components so that the oscillating circuit will eventually enter a stable oscillation mode. Until the oscillating circuit enters the stable oscillation mode, however, the state of the inverting components has high entropic properties. The inverting components of the ring oscillator can each be used to produce respective bits of a random number (e.g., as opposed to using many inverting components to generate a single bit at a time).

Turning now to the figures, FIG. 1 depicts a solid-state drive (SSD) with a random number generation circuit, consistent with embodiments of the present disclosure. SSD 100 can take a number of different physical forms. In some embodiments, SDD 100 can be designed to conform to one or more traditional form factors for disc drives. In other embodiments, SSD 100 can be designed according to customized form factors. In still other embodiments, SSD 100 can be located on a mother board or as a component of a system-on-chip (SOC).

SSD 100 can also be designed to conform to various different electrical signal and communications protocols including, but not necessarily limited to, Serial Advanced Technology Attachment (SATA), Peripheral Component Interconnect Express (PCIe), Serial Attached Small Computer System Interface (SAS), and Universal Serial Bus (USB) which are explicitly referenced in connection with both host interface 116 and connector 104. Embodiments of the present disclosure, however, can also use older or newer interface protocols and both host interface 116 and connector 104 can be designed accordingly.

Consistent with certain embodiments of the present disclosure, one or more buffers 118 might be used to store data communicated to and from SSD 100. This can be particularly useful for improving access times caused by a relatively slow read or write time for the nonvolatile (e.g., flash) memory 128. The buffer 118 could also be used to store firmware metadata, such as the logical to physical mapping of storage blocks. The flash controller 122 can be configured to queue or otherwise control accesses to nonvolatile memory 128 in order to take advantage of the speed of buffer 118. Although a buffer internal to the controller ASIC 126 is depicted in FIG. 1, the buffer could also be an external component, such as a DRAM chip.

Aspects of the present disclosure are directed toward applications that use random numbers. For instance, a number of different security features can use random numbers to prevent malicious/unwanted access to data. In a particular implementation, SSD 100 can be configured to function as a self-encrypting disc drive that uses a security/cryptographic module 120 to encrypt and decrypt data stored on the nonvolatile memory 128. In order to facilitate secure communications, the cryptographic functions of security module 120 can provide improved security when there is a source of truly random numbers, such as those generated by a random number generator 111. The generated random numbers can be used for encryption keys, facilitating secure communication (e.g., via nonces) by performing self-tests and other functions. The present disclosure recognizes that storing prior states of a random number generator poses security risks because an attacker could potentially read the stored states and use this information to predict or force the generation of the same random sequence as was previously stored. This can result in repeated nonces and/or the reuse of the same encryption key(s), which can compromise security of the device.

Certain embodiments of the present disclosure are directed toward the use of a pseudorandom number generator, which can generate a sequence of numbers using an algorithm that is sufficiently complex to make it impractical for an attacker to predict the next generated number even given knowledge of previously-generated numbers. A pseudorandom number generator can be used in conjunction with a random number generator. For example, in FIG. 1, the pseudorandom number generator (referred in the drawing as a "whitener" 114) is a component of the random number generator. Its purpose is to mitigate any fixed pattern (bias) effects in the captured bit sequence, such as a tendency to have an unequal ratio of "1" or "0" bits.

In an alternative embodiment, the pseudorandom number generator is external to the random number generator. In such an embodiment, the pseudorandom generator can issue a special request for a seed, such as at boot time, from a random number generator 111. Such pseudorandom number generators, however, are still deterministic and can be subject to security problems if the initial seed number is comprised or predictable. Accordingly, entropic properties of switching regulator 110 are used by random number generator 111. This entropic source can help ensure the uniqueness of the generated pseudorandom sequences from a resultant seed.

The random number generator 111 also contains an optional component labeled an entropy concentrator 115. In embodiments with less entropy, multiple random numbers can be generated and combined to increase range or the entropy of the output.

The output of the random number generator 111 can also optionally be combined with the output of other random number generators. For example, FIG. 1 shows additional entropy source(s) 123 (e.g., another ring oscillator circuit). The output of one or more additional entropy sources can be convolved 124 with the output of random number generator 111, for example by XORing the streams together, to produce a different random number.

In other embodiments, the additional entropy sources 123 can be used to detect synchronization of the oscillator circuit 110 (e.g., due to external interference). Rather than simply convolving the outputs of the entropy sources together, the outputs of the entropy sources can be monitored to detect correlation. If the two outputs are strongly correlated, this can suggest that they were each similarly affected by external interference. Instead of convolving the outputs, the data can be discarded in response to detecting correlation.

Particular embodiments of the present disclosure are directed toward random number generator 111 producing random numbers based upon entropic properties of the oscillator circuit 110. These entropic properties can be quantified as a measure of unpredictability in a signal value that changes over time. For instance, the outputs of inverter components 108 can exhibit a high level of entropy when they are placed into a metastable state/mode in response to a startup signal. Unlike ring oscillators that produce a single data bit at a time, the metastable condition of each of the inverter components can be used to generate several bits in parallel. Moreover, the parallel generation of the bits can be done by independently capturing entropic properties of signals from the multiple inverter components 108.

The entropic properties of their outputs can be influenced by many sources including, but not necessarily limited to, electrical noise (internal or external), variations in temperature, component tolerances and signal delay. Random number generator 111 can be configured to quantify the entropic properties in a number of different manners, some of which are discussed in more detail herein. These different quantification mechanisms can be used independently or in combination.

Consistent with embodiments of the present disclosure, random number generator 111 quantifies the entropic properties by periodically sampling the outputs of the inverter components 108 to generate data bits. For instance, the state of their outputs can be periodically latched in a register to generate individual bits. The generated individual data bits can be stored until a sufficient number of bits have been generated and stored, or until the circuit settles to a stable oscillatory state. The circuit can be placed into a metastable state multiple times in order to collect additional entropy.

Various embodiments generate multiple bits by utilizing a set of parallel counters for each output of respective inverter components 108. The value of the parallel counters can be read after a set period of time. Each of the counter values can be read out after a certain time period and then used as part of a random number.

According to other embodiments of the present disclosure, random number generator 111 quantifies the entropic properties by storing or latching the value of free-running counters in response to signal transitions of the inverters. The use of free-running counters allows the counter value to be asynchronously changing relative to the ring oscillator circuit. The latching can be in response to a single transition or only after a number of transitions (e.g., using a circuit that counts the number of signal transitions and outputs a signal after a certain number of signal transitions occur). The counter counting rate can be at a much higher rate and also asynchronous to that of the inverter components 108.

Still other embodiments of the present disclosure relate to the use of multiple oscillator circuits 110. The oscillator circuits can be used in parallel or in direct combination. For instance, two parallel streams of random bits can be generated from each oscillator circuit.

The two sets of resulting bits can be merged to generate a single random number or to generate separate and distinct random numbers (e.g., by alternating bits from each of the oscillator circuits or by using XOR functions).

Aspects of the present disclosure recognize that a given oscillator circuit can produce outputs that, for a generated string of bits, the probability of a particular state (e.g., either '0' or '1') is higher than the probability of another state (e.g., the other of '0' or '1'). This bit biasing, with either 1s or 0s predominating, can be compensated for by using various whitening techniques, some of which are discussed in more detail herein. Consistent with embodiments of the present disclosure, the polarity of the bits can be alternatively inverted, resulting in an even number of '1' or '0' bits. Other aspects of the present disclosure recognize that such alternating of bits can result in a pattern of bits for which the probability of two consecutive bits being the same is not the same as a truly random distribution of bits. Further (or different) data processing steps can also be implemented to account for this distribution (e.g., using a jumbled/randomized ordering of the collected bits). Embodiments of the present disclosure also relate to the use of further processing of the quantified value of the entropic properties, e.g., to remove or mask any bias.

While the components, of FIG. 1A may be separate distinct components, additional robustness against hacking and observability can be achieved by integrating the various components within a single die or package of a single chip, e.g., using a single controller ASIC 126 that includes the oscillator circuit 110 and/or the random number generator 111.

Figure 2:
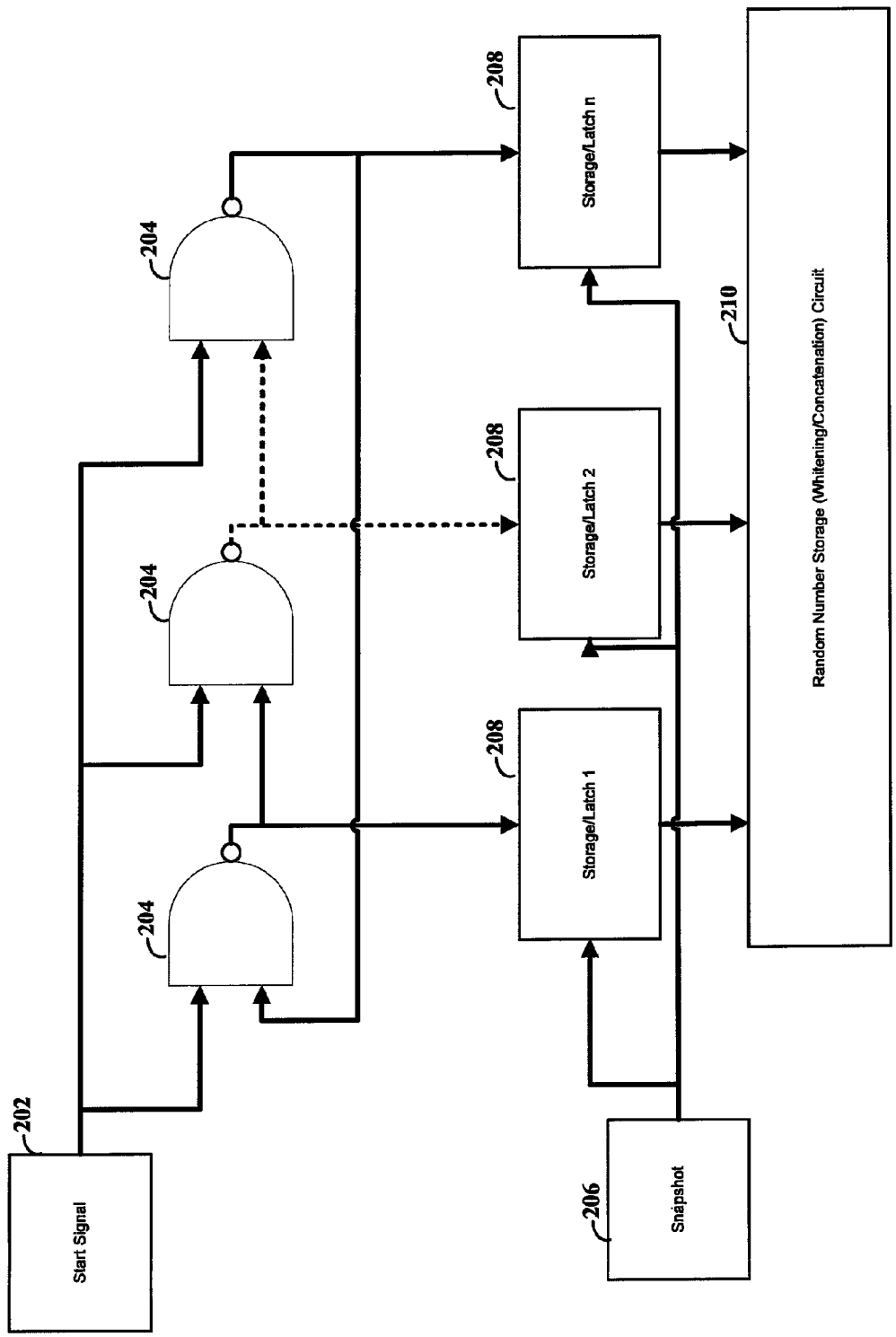
FIG. 2 depicts a block diagram of a circuit for generating random numbers from entropic properties of a ring oscillator circuit using a snapshot approach, consistent with embodiments of the present disclosure.

FIG. 2 depicts a block diagram of a circuit for generating random numbers from entropic properties of a ring oscillator circuit using a snapshot approach, consistent with embodiments of the present disclosure. Inverter components 204 are configured and arranged to operate as a ring oscillator circuit when the proper value is provided from the start signal 202. In particular, inverter, components 204 are NAND gates that oscillate when the start signal 202 is high. By providing the start signal 202 (transitioning the start signal 202 from inactive to active) to each of the inverter components 204 at the same time, the inverter components 204 enter a metastable mode. Inverter components 204 switch at unpredictable times during the metastable mode. This unpredictable switching provides a source of entropy that is captured in the latches 208 in response to a snapshot (enable) input 206.

Snap shot input 206 can be generated asynchronously in relation to the ring oscillator circuit. When snap shot input 206 is activated, the values of the inverter components 204 are captured in a respective latch 208. The captured values can then be stored in random number storage circuit 210. In certain embodiments the values can be whitened and/or concatenated.

Consistent with certain embodiments, snap shot input 206 can be generated using a signal that repeats at a rate that varies according to another entropic source. For instance, the snap shot input 206 can be generated using a clock with a voltage controlled oscillator that is driven by an entropic signal source (e.g., a signal source that randomly varies in voltage). Thus, the latches 208 will capture the entropic data from the inverter components 204 at random times.

Figure 3:
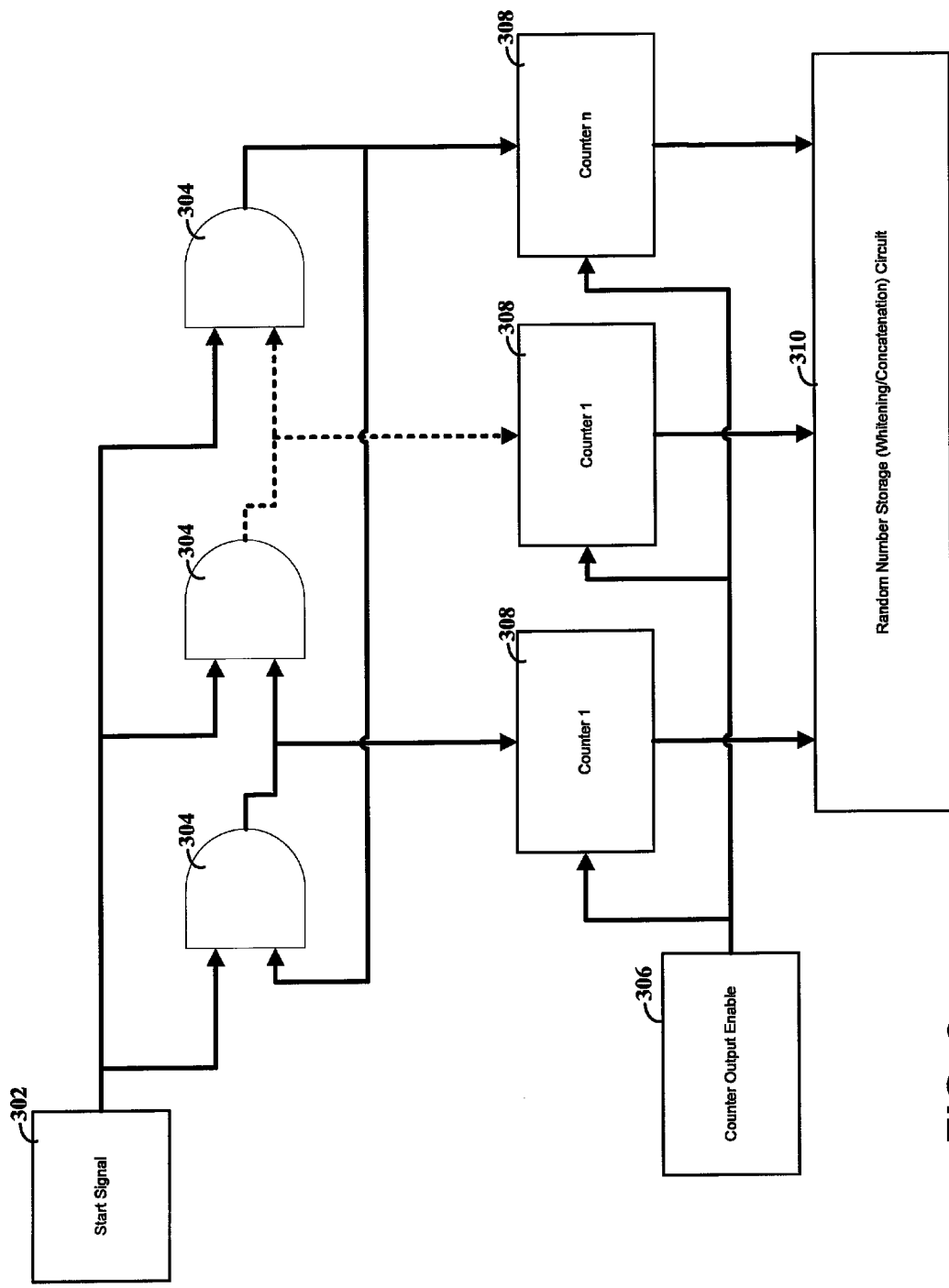
FIG. 3 depicts a block diagram of a circuit for generating random numbers from entropic properties of a ring oscillator circuit using a counter approach, consistent with embodiments of the present disclosure.

FIG. 3 depicts a block diagram of a circuit for generating random numbers from entropic properties of a ring oscillator circuit using a counter approach, consistent with embodiments of the present disclosure. Inverter components 304 are configured and arranged to operate as a ring oscillator circuit when the proper value is provided from the start signal 302. The unpredictable switching of the inverter components 304 in response to the start signal 302 provides a source of entropy that is quantized by the counters 308. Counters 308 count the number of signal transitions from a respective one of the inverter components 304. The counters 308 can count positive transitions, negative transitions or both (e.g., using an appropriate edge-triggered circuit).

Counter output enable 306 is used to cause the counter values from the counters 308 to be stored or otherwise collected. FIG. 3 depicts the counter output enable 306 as controlling the output of the counters 308; however, the counter output enable 306 can be used to latch data in a memory circuit of the random number storage circuit 310.

Counters 308 can be configured with varying number of bits. In certain embodiments, the counters 308 can be designed to reset to their minimum count after reaching their maximum count. The counters 308 can be designed such that maximum count is generally reached multiple times between receipt of consecutive counter output enable 306. This can help avoid skewing the output of the counters 308 toward either lower or higher count values.

Consistent with other embodiments of the present disclosure, the counters 308 can be implemented using a circuit that produces non-sequential values. For instance, a first output could be '0101' and in response to receiving a positive transition the next output could be '1001'. Other possibilities include counters that count in reverse or that count by a certain multiple (e.g., a '4' bit count by '3' counter [0, 3, 6, 9, 12, 15, 2, 5 . . . ]). The particular non-sequential sequence is not limiting and the counters 308 can be implemented using any number of different sequences. Certain aspects of the present disclosure recognize non-sequential values can still be generated in a manner that results in even utilization of all bit combinations. Such even utilization can be particularly useful for reducing bit biasing.

Particular embodiments of the present disclosure are directed toward the use of different types of counters 308 for different inverter components 304. For instance, one counter could be a sequential counter while the next counter could be a non-sequential counter. Using different counters for different inverter components 304 can be useful for masking correlations between the output signals of the inverter components 304.

Certain embodiments of the present disclosure include counters that are configured to operate in multiple modes. For instance, the modes can include both sequential and non-sequential modes. The counter modes can then be dynamically changed periodically or in response to another entropic signal source. This can also be useful for masking correlations between the output signals of the inverter components 304 and/or for adding additional complexity that can be useful for frustrating attempts to predict the random numbers.

Figure 4:
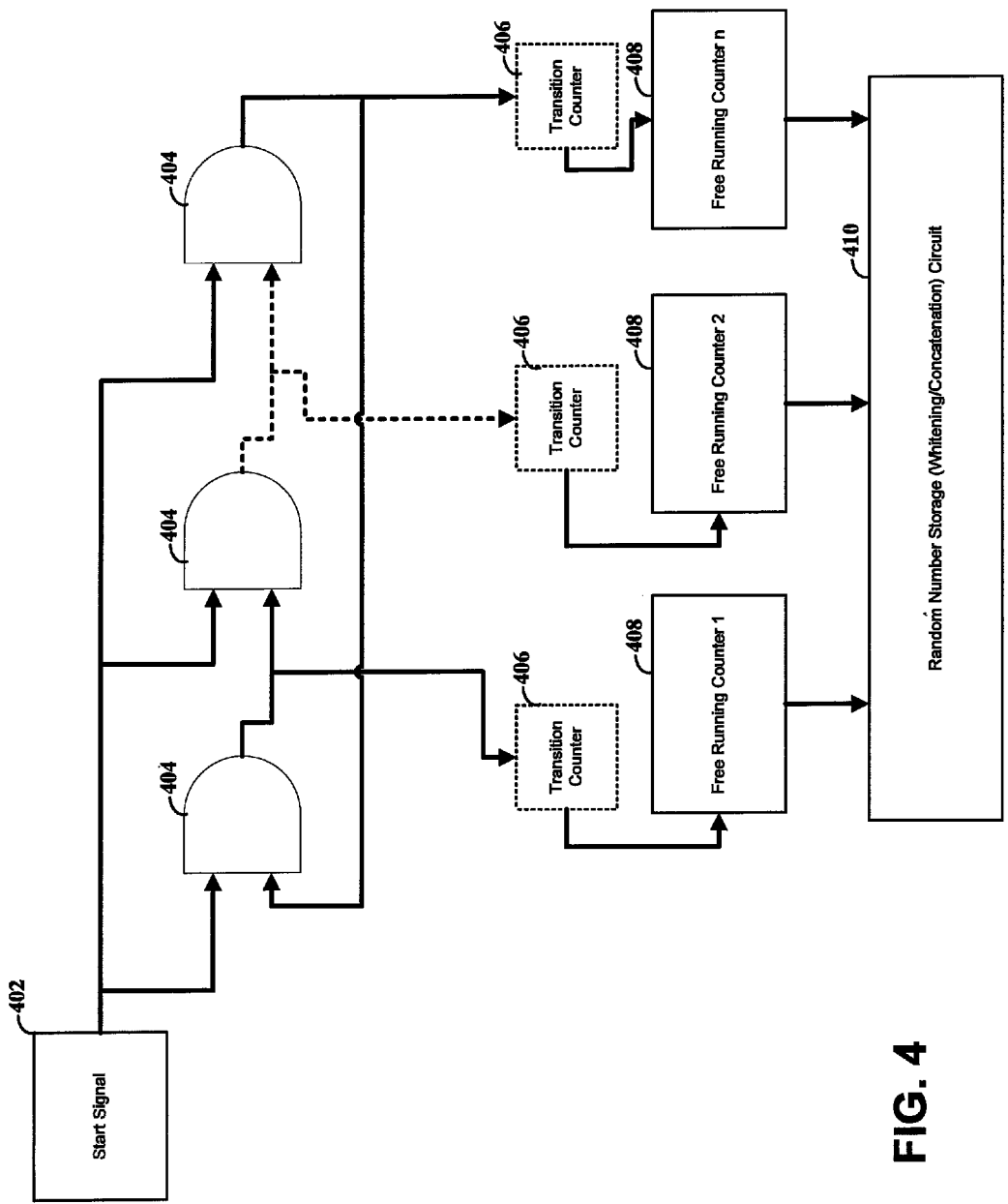
FIG. 4 depicts a block diagram of a circuit for generating random numbers from entropic properties of a ring oscillator circuit using a free-running counter approach, consistent with embodiments of the present disclosure.

FIG. 4 depicts a block diagram of a circuit for generating random numbers from entropic properties of a ring oscillator circuit using a free-running counter approach, consistent with embodiments of the present disclosure. Inverter components 404 are configured and arranged to operate as a ring oscillator circuit when the proper value is provided from the start signal 402. The unpredictable switching of the inverter components 404 in response to the start signal 402 provides a source of entropy that is quantized by the free-running counters 408. Free-running counters 408 are configured to continuously count in a manner asynchronous to inverter components 404. The value of free-running counters 408 is captured in response to transitions of the signals received from the inverter components 404. The transitions can be positive transitions, negative transitions or both (e.g., using an appropriate edge-triggered circuit). The counter values can then be stored in a memory circuit of the random number storage circuit 410.

Certain embodiments of the present disclosure can use optional transition counters 406. Transition counters can provide a transition signal to the free-running counters 408. This allows the free-running counters to count over several transitions of the inverter components 404. Free-running counters 408 can be reset upon capture of an entropic value or can continue counting.

As with the counters discussed in connection with FIG. 3, the free-running counters 408 need not be sequential or the same between different inverter components 404.

Figure 5:
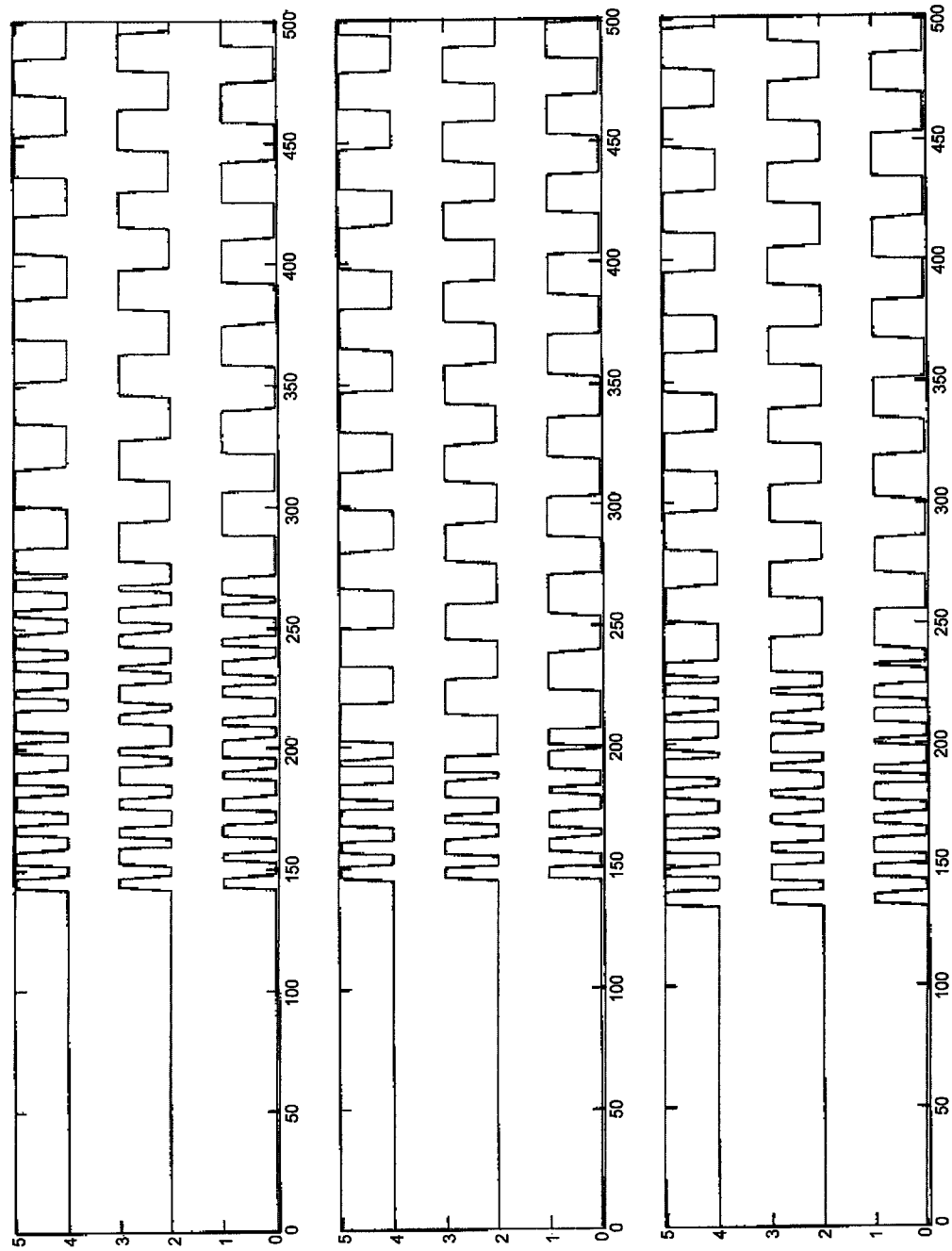
FIG. 5 depicts experimental results showing entropy properties of a startup of an oscillator circuit, consistent with embodiments of the present disclosure.

FIG. 5 depicts experimental results showing entropy properties of a startup of an oscillator circuit. The three sets of waveforms depict the outputs of three NAND gates configured in an oscillator loop and triggered by a startup signal. Each set of waveforms exhibits different signal timings and also different times before stable oscillation is reached. As discussed herein, these and other entropic properties are useful in the generation of random numbers.

The signals and associated logic and functionality described in connection with the figures can be implemented in a number of different manners. Unless otherwise indicated, various general purpose systems and/or logic circuitry may be used with programs in accordance with the teachings herein, or it may prove convenient to construct a more specialized apparatus to perform the required method. For example, according to the present disclosure, one or more of the methods can be implemented in hard-wired circuitry by programming a general-purpose processor, other fully or semi-programmable logic circuitry, and/or by a combination of such hardware and a general-purpose processor configured with software.

It is recognized that aspects of the disclosure can be practiced with computer/processor-based system configurations other than those expressly described herein.

The required structure for a variety of these systems and circuits would be apparent from the intended application and the above description.

The various terms and techniques are used by those knowledgeable in the art to describe communications, protocols, applications, implementations, mechanisms, etc. One such technique is the description of an implementation of a technique expressed in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, it is recognized that a block denoting "C=A+B" as an additive function whose implementation in hardware and/or software would take two inputs (A and B) and produce a summation output (C), such as in combinatorial logic circuitry. Thus, the use of formula, algorithm, or mathematical expression as descriptions is to be understood as having a physical embodiment in at least hardware (such as a processor in which the techniques of the present disclosure may be practiced as well as implemented as an embodiment).

In certain embodiments, machine-executable instructions can be stored for execution in a manner consistent with one or more of the methods of the present disclosure. The instructions can be used to cause a general-purpose or special-purpose processor that is programmed with the instructions to perform the steps of the methods. Alternatively, the steps might be performed by specific hardware components that contain hardwired logic for performing the steps, or by any combination of programmed computer components and custom hardware components.

In some embodiments, aspects of the present disclosure may be provided as a computer program product, which may include a machine or computer-readable medium, having stored thereon instructions which may be used to program a computer (or other electronic devices) to perform a process according to the present disclosure. Accordingly, the computer-readable medium includes any type of media/machine-readable medium suitable for storing electronic instructions.

The various embodiments described above are provided by way of illustration only and should not be construed to limit the invention. Based on the above, discussion and illustrations, those skilled in the art will readily recognize that various modifications and changes may be made to the present invention without strictly following the exemplary embodiments and applications illustrated and described herein. For instance, such changes may include variations on mechanisms for capturing/quantifying entropic properties. Such modifications and changes do not depart from the true spirit and scope of the present invention, which is set forth in the following claims.

What is claimed is:

1. A method comprising:
   providing a common start signal to each of a plurality of inverter components of a ring oscillator circuit and thereby causing the ring oscillator circuit to enter a metastable mode; and
   generating, in parallel, at least a first bit and a second bit of a random number by generating the first bit from entropic properties of a signal of a first one of the plurality of inverter components; and
   generating the second bit from entropic properties of a signal of a second one of the plurality of inverter components.

2. The method of claim 1, wherein the step of generating a first bit includes latching a value from the first one of the plurality of inverter components in response to an enable signal that is asynchronous to the ring oscillator circuit.

3. The method of claim 1, wherein the step of generating a first bit includes latching a value of a free-running counter in response to a transition of the signal of the first one of the plurality of inverter components.

4. The method of claim 1, wherein the step of generating a first bit and the step of generating a second bit each include latching a value from a respective inverter component in response to an enable signal that is asynchronous to the ring oscillator circuit.

5. The method of claim 1, wherein the step of generating a first bit includes quantification of the entropic properties of the signal of the first one of the plurality of inverter components in response to an enable signal having a rate that varies in a random manner.

6. The method of claim 1, wherein the step of generating a first bit includes latching a value of a free-running counter in response to a transition of the signal of the first one of the plurality of inverter components and wherein the free-running counter is a non-sequential counter.

7. The method of claim 1, further including implementing the steps of claim 1 for a second oscillator circuit to generate a second random number and comparing the two random numbers to detect correlations therebetween.

8. A random number generating circuit comprising:
   at least three NAND gates connected in series to form a ring oscillator circuit;
   a common startup signal line connected to an input of each of the least three NAND gates;
   at least three entropic capture circuits, each entropic capture circuit configured and arranged to quantify, in parallel with the other entropic capture circuits, entropic properties of an output signal from a corresponding NAND gate; and
   a memory storage circuit for concatenating and storing each of the quantified entropic properties as a respective bit of a random number.

9. The circuit of claim 8, wherein the at least three entropic capture circuits include latches that receive the output of a respective NAND gate as an input and that are configured to latch the input in response to an enable signal.

10. The circuit of claim 8, wherein the at least three entropic capture circuits include counters that receive the output of a respective NAND gate as an input and that are configured to store an output of the counters in response to an enable signal.

11. The circuit of claim 8, wherein the at least three entropic capture circuits include free-running counters that are configured to store an output of the counters in response to a transition of a signal from an output of a respective NAND gate.

12. The circuit of claim 8, further including multiple counters that are configured to operate in both sequential and non-sequential modes, wherein the counters are configured to generate a count value that is responsive to entropic properties of an output signal for a corresponding NAND gate.

13. The circuit of claim 12, wherein the counters are configured to change between the modes in response to another entropic signal source.

14. The circuit of claim 8, further including free-running counters configured and arranged to continuously count in a manner asynchronous to the NAND gates.

15. The circuit of claim 14, wherein the at least three entropic capture circuits are configured and arranged to captured outputs of the free-running counters in response to transitions of the signals received from the NAND gates.

16. The circuit of claim 14, wherein the free-running counters are configured and arranged to count by a value other than one.

* * * * *